INVENTORS
Kenneth A. Ruddock &
Robert C. Rempel

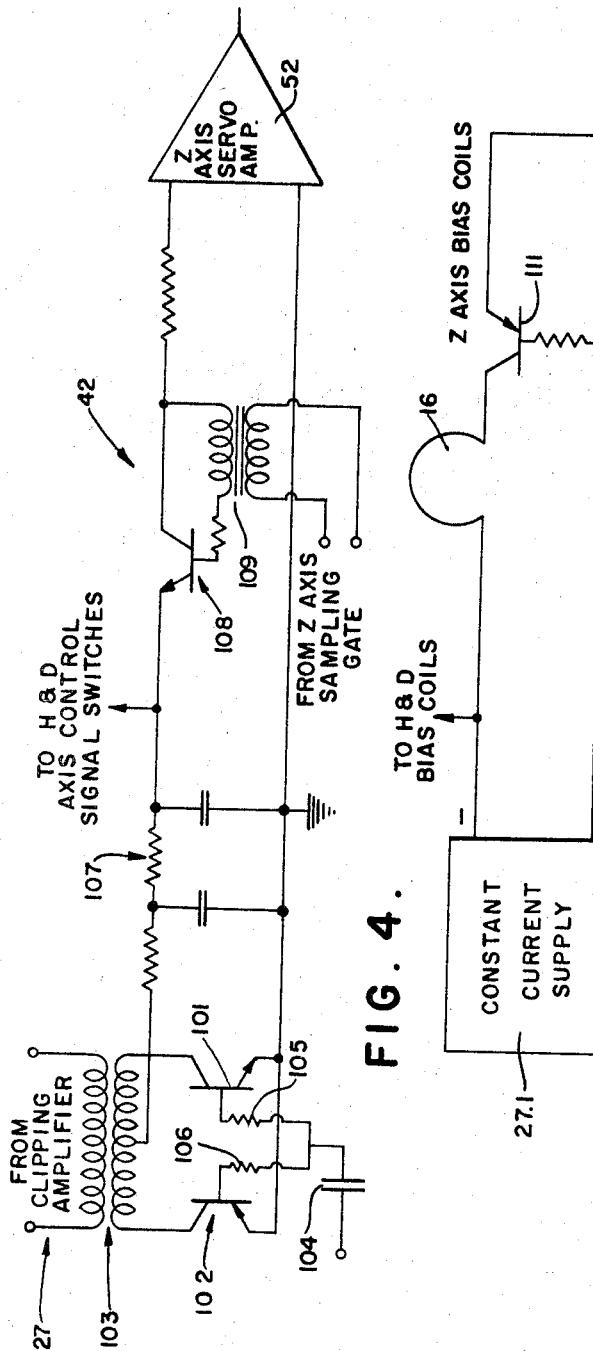
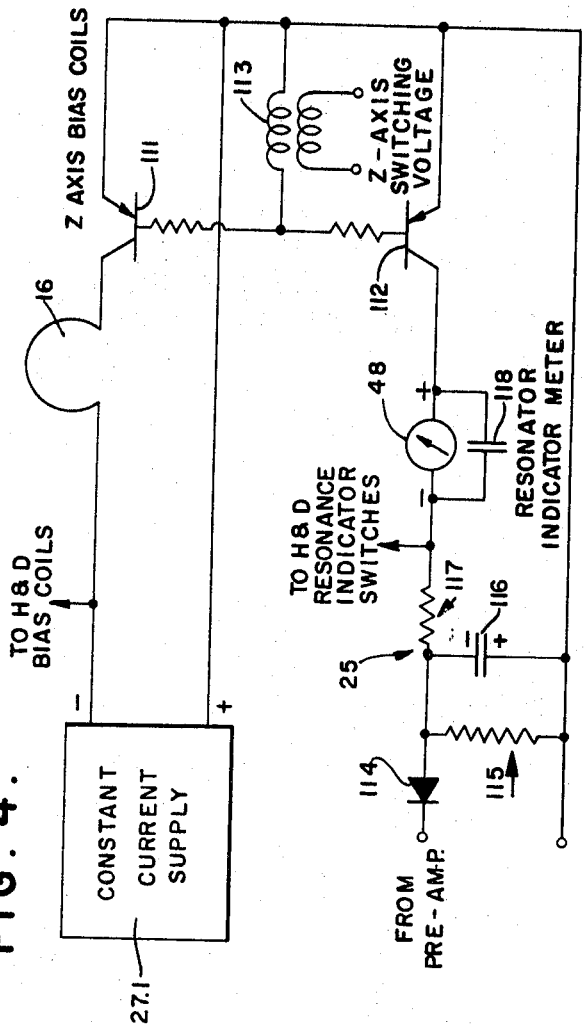
FIG. 4.
FIG. 5.
INVENTORS
Kenneth A. Ruddock &
Robert C. Rempel
ATTORNEYS

United States Patent Office 3,443,208
Patented May 6, 1969

3,443,208
OPTICALLY PUMPED RESONANCE MAGNETOMETER FOR DETERMINING VECTORAL COMPONENTS IN A SPATIAL COORDINATE SYSTEM
James E. Webb, Administrator of the National Aeronautics and Space Administration, with respect to an invention of Kenneth A. Ruddock, Palo Alto, and Robert C. Rempel, Los Altos, Calif.
Filed Apr. 8, 1966, Ser. No. 541,399
Int. Cl. G01r 33/08; G01n 27/72
U.S. Cl. 324—.5                    5 Claims

ABSTRACT OF THE DISCLOSURE

A magnetometer system employing a gas pumped by optical energy, said gas being further excited by both an alternating axial magnetic field having a predetermined frequency and a predetermined large fixed value magnetic field which allows for Larmor precession of the electron spins of the gas atoms. Phase modulation of the optical energy is responsive to changes in the ambient magnetic field. The system includes high speed switching for sequentially measuring the phase difference between the reference phase of the axial magnetic field and that of the modulated optical energy to indicate the magnitude of an unknown magnitude of an unknown magnetic field in each of three orthogonal directions.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates generally to optically pumped magnetometers and more particularly to an optically pumped magnetometer wherein the magnetic vector component in any predetermined direction is detected by applying a precisely known magnetic bias field along this predetermined direction.

In an optically pumped magnetometer, a gas cell is irradiated by a beam of the optical resonance radiation of the same gas or vapor as is contained in the gas cell, thereby preferentially aligning the electron spins of the gas cell atoms along the direction of the beam. The irradiation creates a net magnetic moment in the gas cell, which moment precesses about any static magnetic field which may exist in the gas cell. The magnetometer senses the frequency of precession, which frequency varies accurately and sensitively with variations in the intensity of the magnetic field. In the prior art forms, the optically pumped magnetometer is unable, however, to enable the direction of the field to be determined, that is, the component of the field in each of the three mutually perpendicular directions cannot be determined with previously developed magnetometers of the type being considered, since the precession frequency is independent of field direction.

The present invention enables information to be derived indicative of the magnetic vector in any coordinate direction by surrounding the cell with bias field and field variation coils. In a typical system wherein it is required to measure the magnetic vector in three mutually orthogonal axes, a separate coil is provided for each axis; each coil being arranged to produce a magnetic field along one of the axes of the cell. A predetermined bias field is sequentially applied or commutated to the coils to each axis in turn within the cell. The commutated bias field adds algebraically with the ambient magnetic field component that lies along the same instantaneous direction as the bias field while the ambient magnetic field component orthogonal to the bias field adds vectorially with the commutated bias field. Because the commutated bias field is very large compared with the ambient bias field, the orthogonal ambient field components are essentially decoupled by the vector addition.

Simultaneously with application of the bias field, an alternating magnetic field is applied along the optical axis of the gas cell. The alternating magnetic field has a frequency exactly equal to the appropriate Larmor magnetic resonance frequency of the atoms within the gas cell for the selected predetermined intensity of the commutated bias field.

The lage exciting alternating magnetic field drives the gas atoms to resonance, causing them to precess and amplitude modulate the optical beam at the same frequency as the alternating magnetic field. However, the phase of the spin precession is then a function of the total magnetic field in the direction of the bias field. Hence, by comparing the phase of the amplitude modulation imposed on the optical beam with the phase of the A.C. source driving the cell at the Larmor frequency, the present invention provides information indicative of the magnitude of the magnetic vector in a single coordinate direction. Information indicative of the magnetic vector component in the remaining coordinate directions is derived in sequence, as the biasing coils therefor are activated.

The phase comparison information is derived with a conventional phase detector circuit arranged such that its inputs are in quadrature phase when there is zero external magnetic field along a particular axis. The phase detector output is utilized to servo-control the current in a coil arranged so that it tends to cancel the effect of the external field along a particular axis. The current supplied to the cancelling coil is thus a measure of the field component along the magnet axis of interest.

It is, accordingly, an object of the present invention to provide an optically pumped magnetometer wherein the magnetic field component in a predetermined coordinate direction is measured.

It is another object of the present invention to provide an optically pumped magnetometer wherein the magnetic field component in each of a plurality of orthogonal directions is derived.

It is a further object of the present invention to provide an optically pumped magnetometer wherein the magnitude and direction of a magnetic field can be derived from measurements made indicative of the magnetic field components in each direction of a three coordinate spatial system.

It is an additional object of the present invention to provide an optically pumped magnetometer wherein D.C. biasing magnetic fields are sequentially applied to an optically pumped gas cell so that magnetic field information in a plurality of directions can be derived.

Still another object of the present invention is to provide an optically pumped magnetometer in which a magnetic field component being sensed is combined with a D.C. magnetic biasing field to modulate the phase at which atoms in the gas cell being optically pumped precess, which phase modulation is detected to derive an error signal that cancels the effect on the cell of the sensed field component and is indicative thereof.

The above and still further objects, features and advantages of the present invention will become apparent upon consideration of the following detailed description of one specific embodiment thereof, especially when taken in conjunction with the accompanying drawings, wherein:

FIGURE 4 is a circuit diagram of the phase detector and sampling gate for one of the axes of the system of FIGURE 1; and FIGURE 5 is a circuit diagram of the bias coil current and resonance indicator switches in the system of FIGURE 1.

Figure 1A:
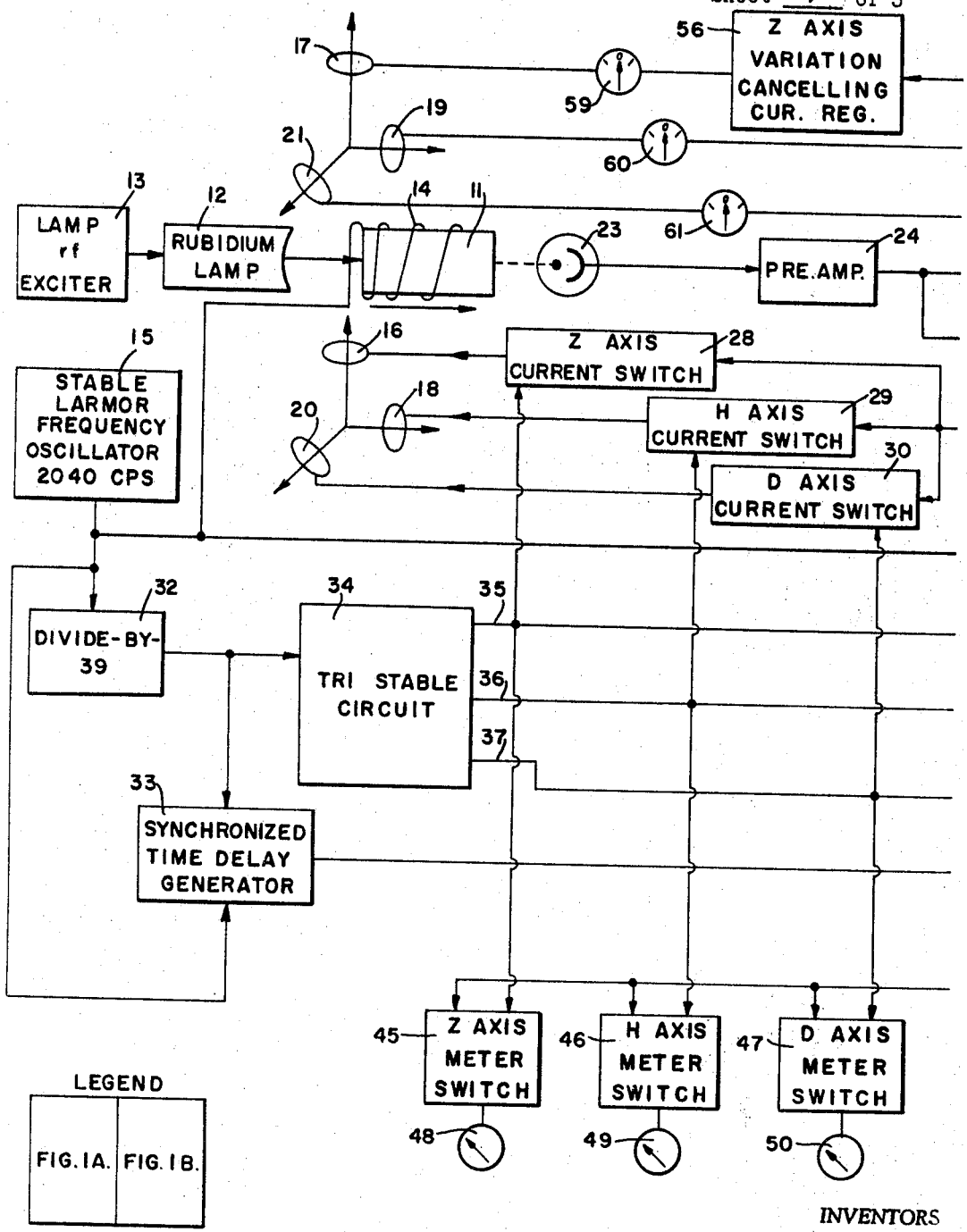
FIGURES 1A and 1B are a block diagram of a preferred embodiment of the present invention.
Figure 1B:
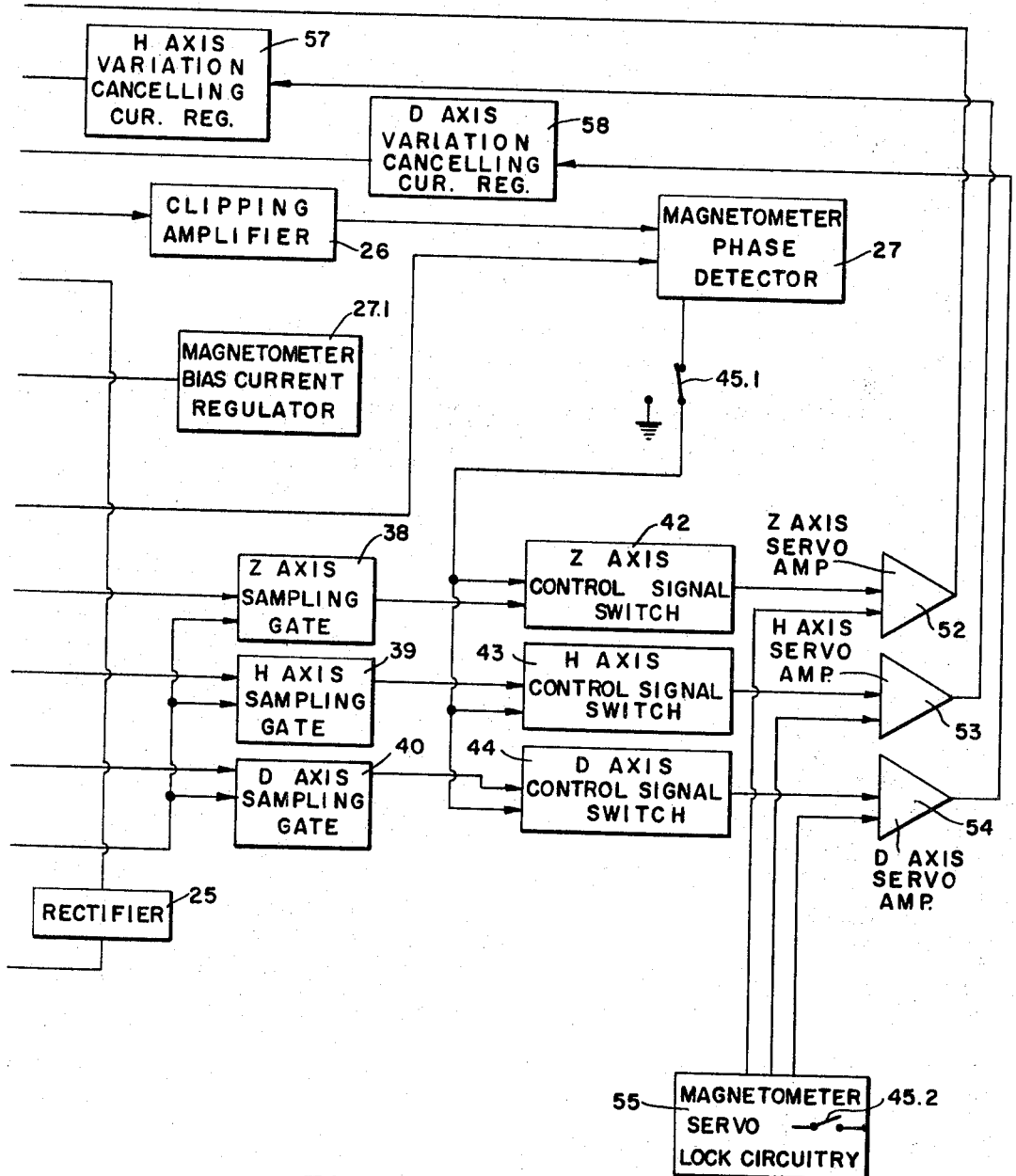

Reference is now made to FIGURE 1 of the drawings wherein gas cell 11 of rubidium 87 vapor is optically pumped in response to irradiation by a beam of optical energy from rubidium lamp 12. Lamp 12 is activated by RF exciting source 13 and the energy thereof is propagated through cell 11 along its longitudinal axis so that electron spins of the gas cell atoms are aligned along the cell longitudinal axis. Wound about the longitudinal axis of cell 11 is coil 14 that is driven from a stable oscillator 15 at a frequency of 2040 c.p.s., the Larmor precession frequency of the rubidium atoms in the cell when placed in a steady magnetic field of intensity equal to 291.5 gammas.

Cell 11 has its longitudinal axis located along the cube diagonal of a three dimensional coordinate system defined by the orthogonal axis Z, H and D. At right angles to each of the axes and magnetically coupled to cell 11 are two sets of coils; at right angles to the Z axis are coils 16 and 17; to the H axis are coils 18 and 19; and to the D axes are coils 20 and 21. Each of coils 16, 18 and 20 is driven with a current to produce a magnetic field of intensity equal to 291.5 gammas in cell 11 along its respective axis. The steady or D.C. magnetic fields derived from the coils in any coordinate direction are combined with the ambient magnetic field being sensed to phase modulate the precession of the electrons in the rubidium vapor contained in cell 11. The phase modulation is reflected in the optical energy propagated through cell 11 and detected by photocell 23.

The output of photocell 23 is amplified by preamplifier 24 which drives rectifier 25 and clipping amplifier 26 in parallel. The clipping amplifier output, which is essentially a square wave of frequency 2040 c.p.s., having its leading and trailing edges determined by the phase of the light energy impinging on photocell 23, is applied as one input to phase detector 27. The other input to phase detector 27 is from oscillator 15 which generates the A.C. field in the gas cell. There is a natural 90° phase shift between the applied A.C. field and resulting light modulation if the D.C. field is exactly at the Larmor frequency value. The phase shift will be greater or less than 90° if, due to the existence of an ambient field, the D.C. field is greater or less than the 2040 cycle Larmor value. The phase detector 27 produces zero output voltage when its signal input is 90° phase displaced from its reference input, and provides a positive or negative output proportional to the signal phase shift above or below the 90° value. Thus, the output of phase detector 27 indicates the magnitude and sign of any component of the ambient magnetic field which is coplanar with the bias field.

To enable information indicative of the magnetic fields in only one coordinate direction to be separately derived, each of coils 16, 18 and 20 is sequentially driven with the bias current from regulated supply 27.1 through switches 28–30, respectively, to produce a magnetic field of 291.5 gammas in each of the three coordinate directions. Thereby, only one of coils 16, 18 and 20 is effective at any time to provide a biasing magnetic field to the rubidium atoms in cell 11. In consequence, the output of phase detector 27, at any time, is indicative of the magnetic field component along the coordinate direction of the axis associated with any given coil; for instance, if coil 16 is activated to the exclusion of coils 18 and 20, the phase detector output is a signal indicative of the ambient magnetic field in the Z axis.

To eliminate any possibility of noise in switching current from supply 27 to coils 16, 18 and 20, switches 28, 29 and 30 are activated in synchronism with the oscillations deriving from the 2040 c.p.s. Larmor frequency source 15. Synchronism is obtained by supplying the stable output of the source 15 to frequency divider 32 which reduces the 2040 c.p.s. frequency by a factor of 39 to derive a pulse train having a frequency of 52.308 c.p.s. The pulses deriving from frequency divider 32 are applied in parallel to synchronized time delay generator 33 and tri-stable circuit 34.

Each of tri-stable circuit 34 and generator 33 derive a rectangular pulse having a duration of 16.67 milliseconds. The leading edge of the rectangular wave deriving from generator 33 occurs $\frac{1}{408}$ of a second after an output pulse is generated by frequency divider 39. Tri-stable circuit 34 derives three separate rectangular waves, each of which is positive at a different time interval. The leading edge of each of the waves is triggered by a pulse from frequency divider 32 so that a positive voltage is sequentially derived for a duration of $\frac{1}{52.308}$ second on leads 35, 36 and 37. After the trailing edge of the positive going waveform on lead 37 occurs, a positive going voltage is again derived on lead 35. Hence, it can be considered that circuit 34 derives a three phase rectangular wave output having a frequency of 17.436 c.p.s., wherein a positive going wave occurs on each of the leads 35–37 during exactly one-third of each cycle.

The gating voltages derived by trio-stable circuit 34 on leads 35–37 are applied to AND gates 38–40, respectively. Each of gates 38–40 is also driven by the rectangular wave output of the synchronized time delay generator 33. The circuits of each of D.C. AND gates 38–40 are such that the output thereof is positive only when two inputs thereof are simultaneously positive. The time delay generator output goes positive after a time delay of $\frac{1}{408}$ second from the time when each of the tri-stable outputs goes positive. The output of AND gate 38 thus goes positive $\frac{1}{408}$ second after its input line 35 goes positive. The AND gate output remains positive until both of its inputs go negative. The timing is such that the positive outputs lasts $\frac{1}{60.00}$ second. Thereby, each of gates 38–40 sequentially derives a gating output for 16.67 milliseconds ($\frac{1}{60}$ of a second), which gating wave occurs $\frac{1}{408}$ second subsequent to pulse deriving from frequency divider 32. The gating waves derived from gates 38–40 are applied to switches 42–44, respectively. Each of switches 42–44 is driven, in parallel, from the output of phase detector 27 via switch 45.1 that is maintained in the closed position illustrated during normal operation.

The outputs of tri-stable circuit 34 are also employed to sequentially switch the current from source 27 to each of coils 16, 18 and 20 via switches 28–30, respectively. Since the leading edge of the positive voltage applied to each of switches 28–30 occurs prior to a gating wave being derived from gates 38–40, any possibility of transient noise occurring at the time of switching the current source between the biasing coils being reflected in the output of switches 42–44 is virtually eliminated. Because of the synchronous opeartion of the present system wherein switching of current from source 27 to each of coils 16, and 18 and 20 is substantially simultaneous with an axis crossing of the sinusoid from source 15, transient noise is eliminated since the operation is exactly the same each cycle. Switching effects are reduced to a very small constant offset.

The three outputs of tri-stable circuit 34 are further employed to sequentially activate each of switches 45–47 so that the voltage deriving from rectifier 25 can be selectively passed to each of meters 48–50. Meters 48–50 indicate the degree of resonance in each of the three coordinate axis; they are employed in the initial adjustment of the system, and for monitoring its operation.

To provide an initial adjustment, the three components of the average-value earth's field are cancelled to within the magnitude of the daily field variations (typically 50 gammas) by means of three sets of coils (not shown) co-axial with coils 17, 19 21. Then, with switch 45.1 open so that the output of phase detector 27 is decoupled from switches 42–44, servo amplifiers 52–54 for each coordinate direction are supplied with D.C. voltages from three separate D.C. sources contained in magnetic servo lock circuitry 55. The voltages derived from the D.C sources contained in circuitry 55 are used for the initial balance to bring the magnetic field of the cell within the automatic lock range of the magnetometer, i.e. the effect of the earth's mangetic field on cell 11 is substantailly nullified, enabling the cell to function as a sensitive "zero" field magnetometer. To bring the magnetometer within its automatic locking range, current is supplied to three sets of coils (not shown), respectively having their axes parallel with coils 17, 19 and 21, from an external source until the readings of ammeters 59–61 are zero. The D.C. sources in lock circuit 55 are now adjusted to maximize the readings on each of resonance indicating meters 48–50. The fields deriving from the coils driven from the external source are again adjusted to provide meters 59–61 with null readings. The process is iteratively repeated until the readings of meters 48–50 are maximized and those of meters 59–61 zeroed.

When these conditions are reached, switch 45.1 is closed and switch 45.2 is opened, whereby detector 27 is coupled with switches 42–44 and circuit 55 supplies zero voltage to amplifiers 52–54. The coil arrangement described, together with the servo loop provided, enables the magnetometer to operate as an accurate zero field device independently of the fluctuation in the current supplied by the external source whereby the phase detector output now automatically provides the inputs for servo amplifier 52–54 required to balance the system. Meters 59–61 thus provide, during an actual measuring operation, a measure of the magnetic field deviation from the known ambient field at the time of the initial adjustment.

Subsequent to initial adjustment, the magnetometer determines ambient magnetic fields by adjusting the currents in coils 17, 19 and 21 to cancel, via the servo loop formed, the effects of the field being measured on the phase angle of the magnetic resonance in each of the three coordinate directions. Thus, with switch 28 activated whereby coil 16 supplies a magnetic field to cell 11 along the Z axis, the D.C. output of phase detector 27 is indicative of the measured field along the Z axis. The phase detector output is coupled through switch 42 and amplifier 52 to adjust the D.C. current supplied by current regulator 56 to coil 17.

Coil 17 produces a D.C. field that cancels the effect of the ambient field along the Z axis. The magnitude and direction of the current required by coil 17 to nullify the effect of the Z component of the field being measured is thereby an indication of the field component in that direction.

In a similar manner, the sequential activation of coils 18 and 20 results in current regulators 57 and 58 deriving currents to nullify the effects of the ambient magnetic field components in the H and D directions. Also, meters 60 and 61 measure the magnetic field components in the H and D axis. From the data derived from meters 59, 60 and 61, it is possible to calculate the resulting magnetic field vector in terms of both magnitude and direction. Of course, it is to be understood that in many instances meters 59–61 are replaced or supplemented by current responsive apparatus performing other system functions.

Figure 2:
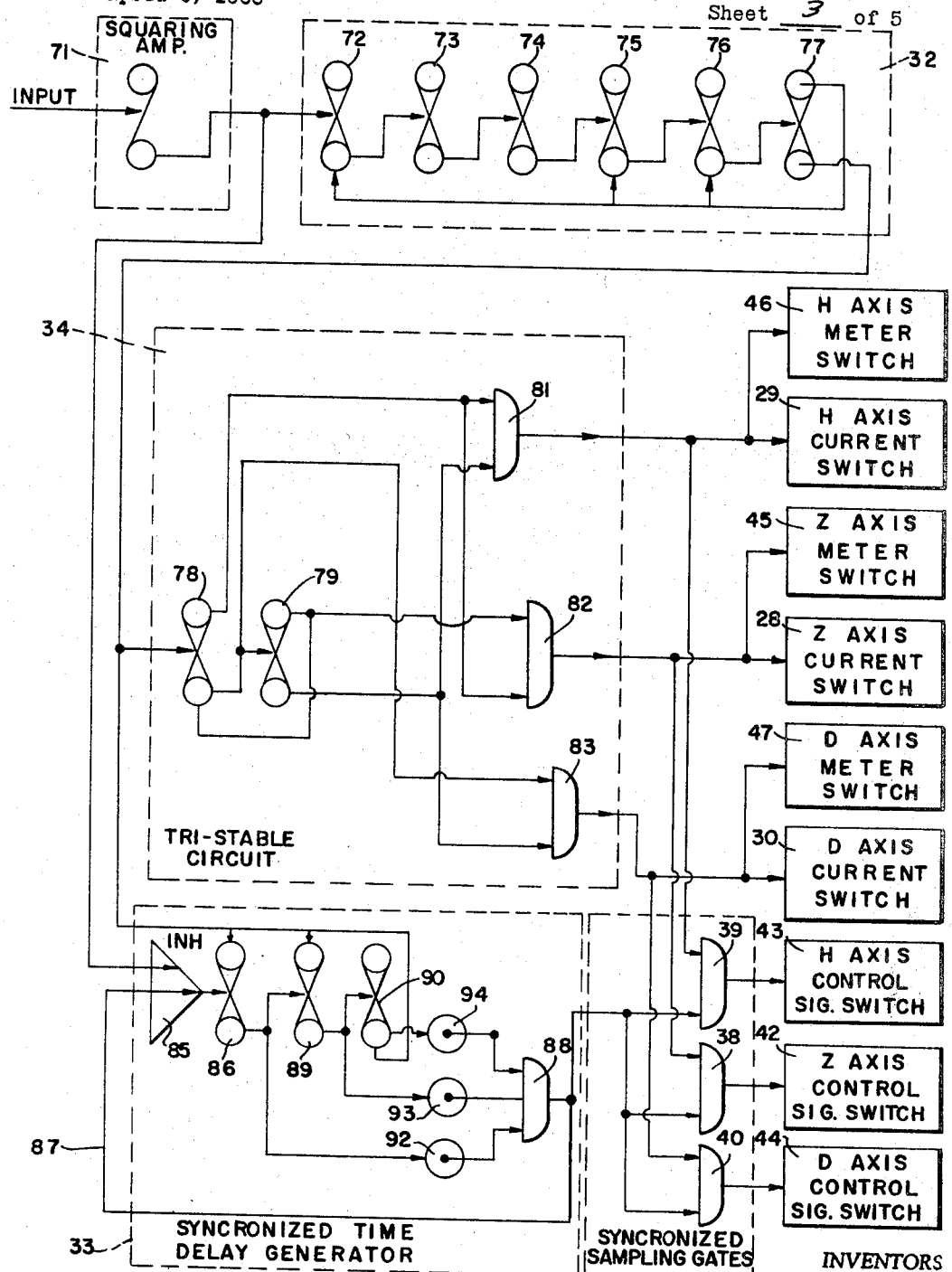
FIGURE 2 is a circuit diagram of a preferred embodiment of the electronic commutator logic circuitry employed in FIGURE 1.
Figure 3:
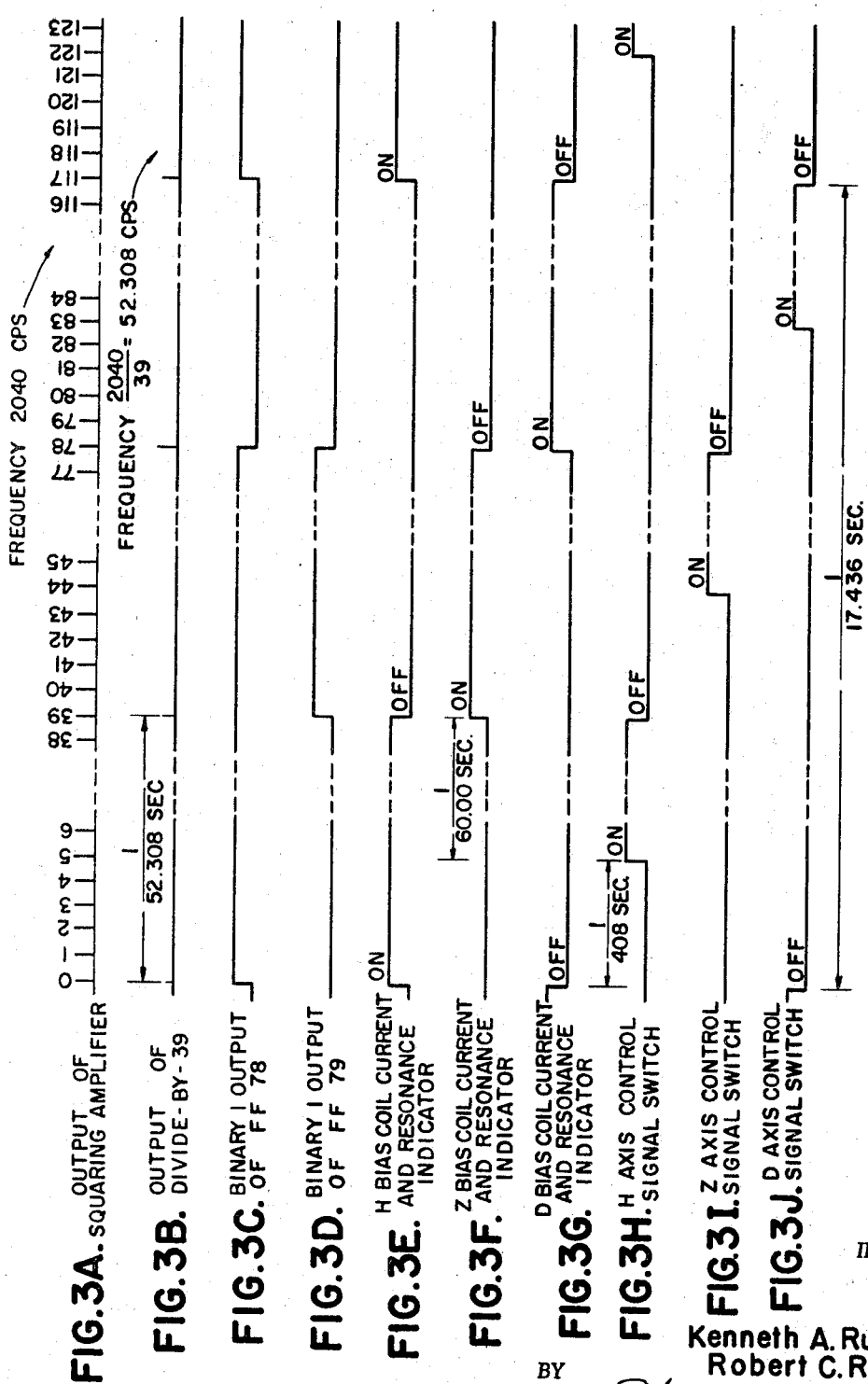
FIGURES 3A through 3J are timing diagrams illustrating the waveforms derived with the circuitry of FIGURE 2.

Reference is now made to FIGURES 2 and 3 of the drawings which respectively illustrate the electronic circuitry employed in the commutator logic circuit of FIGURE 1 and waveforms derived in the logic circuits. The sinusoidal output of oscillator 15 is applied to squaring amplifier 71 which derives a series of pulses at the same frequency, 2040 c.p.s., as the source, as illustrated in FIGURE 3A. Squaring amplifier 71 is arranged so that each pulse derived thereby occurs in response to the sinusoidal voltage from oscillator 15 crossing the zero axis in a positive direction. The squaring amplifier drives synchronized time delay generator 33 and divide by 39 frequency divider 32 in parallel.

Frequency divider 32 comprises six cascaded flip-flops 72–77. The output from the binary one side of flip-flop 77 is fed back to the inputs of the binary zero halves of flip-flops 72, 75 and 76 whereby the normal 64 bit count of the six flip-flop arrangement is subtracted from by 25 to achieve the count of 39. Thereby, a pulse output is derived from the zero side of flip-flop 77 for each 39 pulses applied by amplifier 71 to divider 32 to derive a series of pulses having a frequency of 52,308 c.p.s., as indicated by FIGURE 3B.

The 52.308 c.p.s. output of divider 32 is applied to bi-stable flip-flop 78 included in tri-stable circuit 34. The binary zero half of flip-flop 78 is coupled to the input of flip-flop 79, the binary one-half of which is coupled via a feedback path to the binary zero half of flip-flop 78. Thereby, flips-flops 78 and 79 together form a divide by three frequency divider. Flip-flops 78 and 79 are sequenced as indicated by the following table, wherein pulse number refers to the numbered pulses in FIGURE 3A and the tabulated ones and zero indicate the energized and deenergized states of the flip-flop outputs, respectively.

TABLE

| Pulse No. | Flip-flop 78 | | Flip-flop 79 | |
| --- | --- | --- | --- | --- |
| | 1 output | 0 output | 1 output | 0 output |
| 0 | 1 | 0 | 0 | 1 |
| 39 | 1 | 0 | 1 | 0 |
| 78 | 0 | 1 | 0 | 1 |
| 117 | 1 | 0 | 0 | 1 |

The binary 1 outputs, deriving from upper active elements of flip-flops 78 and 79, are indicated by FIGURE 3C and FIGURE 3D, respectively.

The rectangular wave forms deriving from the binary zero and binary one halves of flip-flops 78 and 79 are combined in AND gates 81–83 to derive the waveforms of FIGURE 3E, FIGURE 3F, and FIGURE 3G, respectively. The rectangular waveforms deriving from AND gates 81–83 are applied to H axis current switch 29, Z axis current switch 28 and D axis current switch 30, respectively. Switches 28–30 are enabled to pass current from source 27 to coils 16, 18 and 20 whenever the AND gate feeding them has a positive output. Hence, current is applied by source 27 to coil 18 between pulses 0 and 39, current is supplied by source 27 to coil 16 between pulses 39 and 78 and current is supplied by source 27 to coil 20 between pulses 78 and 117.

In a similar manner, switches 45–47 are sequentially activated during exactly the same time periods that switches 28–30 are respectively energized. Thereby, the D.C. voltages indicative of the amplitude of the wave impinging on photocell 23 are coupled to each of meters 48–50 during the interval when coils 16, 18 and 20, respectively, are supplied with current from source 27.

Synchronized time delay generator 33 comprises an inhibit gate 85 for selectively passing pulses from squaring amplifier 71 to flip-flop 86. The pulses from squaring amplifier 71 are passed through the inhibiting gate only when the voltage on lead 87, as derived by the output of AND gate 88, is negative. Flip-flop 86 is cascaded with flip-flops 89 and 90 to form, with AND gate 88, a predetermined counter from which an output is derived after five pulses have been applied to flip-flop 86. The predetermined counter is preloaded with a count of three in response to the pulse output of divider 32. Hence, the pulse output of divider 32 preloads with ones the binary one states of flip-flops 86 and 89 and the zero state of flip-flop 90. Thereby, in response to pulse number 5, FIGURE 3A, each of flip-flops 86, 89 and 90 is activated to the binary zero state.

The energization of flip-flops 86, 89 and 90 to the binary zero states is reflected as a positive voltage at the outputs of emitter followers 92-94, respectively, so that a positive voltage is derived from AND gate 88. In response to the positive voltage from AND gate 88, inhibit gate 85 prevents the application of additional pulses from squaring amplifier 71 to flip-flop 86 and flip-flops 86, 89 and 90 all remain in the binary zero state until pulse number 39, FIGURE 3A, is derived.

In response to pulse 39, flip-flops 86, 89 and 90 are re-energized to the count of three whereby a negative output is derived from AND gate 88 and pulses from squaring amplifier 71 are again applied to the input of flip-flop 86.

During the interval between pulses 5 and 39, a positive output is derived from AND gate 88 to energize each of AND sampling gates 38-40 in parallel. Since AND gate 39 is also responsive to the output of AND gate 81, which is positive during the interval from pulse zero to pulse 39, a positive voltage is generated by AND gate 39 in the time period between pulses 5 and 39, as indicated by FIGURE 3H. By providing the delay between the time when switch 43 is enabled to pass the output of detector 27 after the time at which coil 18 is initially energized with current from source 27 any transients in the signal deriving from preamplifier 24 due to switching are not coupled to the input of H axis servo amplifier 53.

In a similar manner, AND gate 38 and control switch 42 are energized in the interval between pulse 44 and pulse 78, as indicated by FIGURE 3I while AND gate 40 and control switch 44 are energized in the interval between pulses 83 and 117, as shown by FIGURE 3J. Thereby, all transients in each coordinate direction are suppressed from reaching current regulators 56-68. The utilization of an all electronic commutator enables synchronous switching between the data signals derived and the application of excitation field to coil 14 by oscillator 15. In addition, the electronic network has been found to be highly reliable, easy to maintain, capable of operation at desired high speeds, easily adjusted to eliminate power line effects and relatively economical. By employing a 1⁄60.00 second sampling time on each axis, we have found that it is possible to avoid interference from environmental magnetic fields at the power line frequency and its harmonics.

Reference is now made to FIGURE 4 of the drawings wherein a circuit diagram for a preferred embodiment of the phase detector 27 and the Z axis control signal switch 42 is illustrated. Phase detector 27 comprises NPN transistor 101 and PNP transistor 102. The collectors of transistors 101 and 102 are connected to opposite ends of the secondary winding of transformer 103, the primary of which is driven by a rectangular wave deriving from clipping amplifier 26. The base emitter junctions of transistors 101 and 102 are driven in parallel by the 2040 c.p.s. output of source 15 via capacitor 104 and resistances 105 and 106. Thereby, each of transistors 101 and 102 is driven into conduction during a different half cycle of the sinusoidal wave deriving from source 15. Similarly, the collector emitter paths of transistors 101 and 102 are enabled during each half cycle of the rectangular wave coupled through transformer 103. The time during which transistors 101 and 102 are energized provides a measure of the phase difference between the reference wave and the rectangular wave deriving from the clipping amplifier. The series of positive and negative pulses resulting from the alternate conduction of transistors 101 and 102 is integrated by resistance capacitance network 107.

The integrated voltage derived from network 107 is applied in parallel to each of switches 42, 43 and 44. For purposes of simplicity, only switch 42 is illustrated. Switch 42 comprises an NPN transistor having its emitter directly responsive to the output of integrator 107 and its base collector junction driven by the positive rectangular wave deriving from X axis sampling gate 38 via transformer 109. The positive voltage applied between the collector base junction of the inverted transistor 108 is sufficiently large to drive the transistor into saturation with a minimum D.C. offset voltage. When the voltage deriving from Z axis sampling gate 38 is zero transistor 108 is cut off to prevent the flow of current from integrator 107 to Z axis servo amplifier 52.

Reference is now made to FIGURE 5 of the drawings wherein current from regulated current supply 27.1 is selectively applied to Z axis bias coil 16 simultaneously with the application of a signal from preamplifier 24 to resonance indicator meter 48 via rectifier 25. The flow of current from source 27 and preamplifier 24 to coil 16 and meter 48 occurs simultaneously by driving PNP transistors 111 and 112 into saturation in response to the Z axis switching voltage deriving from AND gate 82, FIGURE 2. The Z axis switching voltage is coupled through transformer 113 to the base emitter junctions of transistors 111 and 112 with such a polarity as to drive the transistors simultaneously to saturation during the interval between pulse 39 and pulse 78. With transistor 111 driven into saturation, constant current supply 27.1 feeds sufficient current to coil 16 to supply a bias field of 291.5 gammas to gas cell 11 along the Z axis; the bias field required to excite the rubidium atom to the resonant frequency of 2040 c.p.s. In a similar manner, each of bias coils 18 and 20 is supplied with the same amount of current to provide an identical field in the other two coordinate directions. Of course, coils 18 and 20 are energized via circuitry identical to that illustrated for the Z axis bias coil 16.

Rectifier 25, included between the output of preamplifier 24 and resonator indicator meter 48, comprises a diode connected so as to develop a negative voltage at the collector of transistor 112 in response to the sinusoidal output of the premaplifier. The anode of diode 114 is connected to a smoothing circuit including the parallel, shunt combination of resistor 115 and capacitor 116 and series resistor 117. At the junction between resistor 117 and meter 48, there are connections to meters 49 and 50 which are connected in circuits identical to that illustrated for meter 48.

Low impedance D.C. ammeter 48 is shunted by capacitor 118 so that the voltage developed across the meter when it is coupled to the rectifier 25 remains there even during the interval when meters 49 and 50 are responsive to the rectifier output. Hence, one observing meters 48-50 does not see any flutter in the movement thereof but is provided with a constant indication of the resonant signal amplitude in each coordinate direction.

We claim:
1. A magnetometer for measuring magnetic field components in a plurality of orthogonal coordinate directions, said magnetometer comprising: a gas, a source of optical energy for pumping said gas, means exciting said gas by a driving magnetic field having a predetermined frequency and reference phase, said driving magnetic field causing precession of the electron spins of the gas atoms which precession causes modulation of said optical energy exiting from said gas; means for detecting said modulation of said optical energy; first means for applying a predetermined large amplitude D.C. magnetic field to said gas sequentially in each of said coordinate directions to allow a Larmor precession frequency of said electron spins; means for sequentially detecting the phase difference between said modulation of optical energy and said reference phase of said driving magnetic field for each of said coordinate directions; second means responsive to each of said detected phase differences for sequentially applying a D.C. rebalancing magnetic field of variable magnitude to said gas along the coordinate direction corresponding to that of the field applied by said first means, said D.C. rebalancing magnetic field magnitude being dependent upon said detected phase difference; and means for coupling the detected phase difference with said second means after a predetermined time period subsequent to activation of said first means.

2. The magnetometer of claim 1 further including means for activating said first named applying means in sequence simultaneously with an axis crossing of the magnetic field applied to said gas at said Larmor frequency.

3. The magnetometer of claim 1 further including means for deriving an indication of the amplitude of the phase detected signal in each of said coordinate directions.

4. A magnetometer for vectorally measuring the coordinate components of a magnetic field comprising:
  (a) a gas adapted to be pumped by optical energy;
  (b) a source of optical energy for said gas, having a beam, said beam being impinged upon said gas for pumping;
  (c) means for exciting said gas with a driving magnetic field at a predetermined phase and frequency which provides driven precession of the electron spins of the gas atoms, said precession causing modulation of said beam of optical energy;
  (d) means for detecting said modulation of said beam of optical energy exiting from said gas;
  (e) means for sequentially applying a large amplitude D.C. known biasing magnetic field to said gas in three orthogonal directions allowing a Larmor precession frequency of said driving electron spins;
  (f) means for detecting the phase difference between said modulated optical beam and said phase of said driving magnetic field; and
  (g) means responsive to said detected phase difference for applying a rebalance steady magnetic field in the direction corresponding to as said existing sequentially applied large amplitude steady known biasing magnetic field, wherein the magnitude of said rebalance magnetic field is indicative of the magnitude of the coordinate component of the magnetic field being measured.

5. A method for making sequential measurements of magnetic field strength in three mutually orthogonal directions, the steps comprising:

optically irradiating a gas cell to align the electron spin of the atoms in the cell in the direction of the beam along the optical axis of said cell;

applying an alternating magnetic field along the said optical axis at a frequency exactly equal to the Larmor magnetic resonance frequency at the intensity of a large predetermined fixed value magnetic field;

sequentially applying said large predetermined fixed value magnetic field in each of said three mutually orthogonal directions exclusively, during a first, second, and third interval, said sequential application being accomplished by high speed switching;

measuring the phase of the optical irradiation passing through said gas cell during each of said first, second, and third intervals, said phase measurement being relative to the phase of said alternating magnetic field;

applying a slowly variable cancelling magnetic field to said gas cell in each of the said mutually orthogonal directions exclusively during the first, second and third interval, said slowly variable cancelling magnetic field being responsive to changes in the phase of said optical irradiation during the respective first, second and third interval, said slowly variable cancelling magnetic field being a feedback to maintain the said phase of said optical irradiation at a constant value.

References Cited

UNITED STATES PATENTS

| | | | |
|---|---|---|---|
| 3,071,721 | 1/1963 | Dehmelt | 324—0.5 |
| 3,158,802 | 11/1964 | Jung | 324—0.5 |
| 3,191,118 | 6/1965 | Jung | 324—0.5 |
| 3,206,671 | 9/1965 | Colegrove | 324—0.5 |
| 3,256,500 | 6/1966 | Arnold | 324—0.5 |

OTHER REFERENCES

Applied Optics—vol. 1, No. 1, January 1962, pp. 61–68 (Bloom).

RUDOLPH V. ROLINEC, *Primary Examiner.*

MICHAEL J. LYNCH, *Assistant Examiner.*